Patented June 20, 1950

2,512,520

UNITED STATES PATENT OFFICE 2,512,520

HYDROXYALKYLAMINOALKYL PHENOTHIAZINE DERIVATIVES AND THE PRODUCTION THEREOF

John W. Cusic, Skokie, Ill., assignor to G. D. Searle & Co., Skokie, Ill., a corporation of Illinois No Drawing. Application December 24, 1947, Serial No. 793,754

21 Claims. (Cl. 260—243)

This invention relates to phenothiazyl-substituted allyl amines having substituted on the aliphatic nitrogen atom one or more hydroxyalkyl radicals, to salts of said amines, and to processes for preparing the same. More particularly this invention is concerned with amines of the following general structural formula

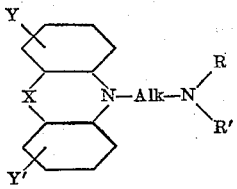

wherein X is S, SO or $SO_2$, Y and Y' are hydrogen atoms or substituent groups, Alk is an alkylene radical, R is an alkyl radical substituted with one or more hydroxyl groups, and R' is hydrogen, alkyl or hydroxyalkyl.

It is an object of this invention to provide new chemical substances of the foregoing general formula which are useful in the medical and related arts. It is a further object of this invention to provide efficient manufacturing processes for such substances.

In the foregoing structural formula, X represents a sulfur containing bivalent radical, such as S, SO or $SO_2$, and Y and Y' represent hydrogen or monovalent substituents attached to the benzenoid rings of the phenothiazine nucleus, such as alkyl radicals, halogen radicals, alkoxyl radicals and the like. It is thus seen that the phenothiazine nucleus may be an unsubstituted phenothiazyl radical, a phenothiazyl radical substituted by alkyl, halo or alkoxyl groups, an oxide of a phenothiazyl radical, as for example, a monoxide or a dioxide, or an oxide of a substituted phenothiazyl radical.

The alkylene radical, Alk, represents a bivalent radical derived from a saturated hydrocarbon by the removal of hydrogen atoms from two different carbon atoms. It therefore includes such radicals as ethylene, propylene, trimethylene, tetramethylene, 1,2-butylene, 2,3-butylene, 1,3-butylene, the amylenes and higher bivalent aliphatic radicals.

The hydroxyalkyl radical, R, is chosen from groups such as β-hydroxyethyl, γ-hydroxypropyl, β-hydroxypropyl, β-hydroxyisopropyl, β,γ-dihydroxypropyl, γ-hydroxybutyl, β-hydroxybutyl, β-hydroxyisobutyl, δ-hydroxybutyl, β-hydroxyamyl, β-hydroxyisoamyl and related hydroxylated radicals. The group R' represents hydrogen, hydroxyalkyl groups of the foregoing type, and lower alkyl radicals of one to six carbon atoms which may be straight or branched chained.

My invention is illustrated by the following compounds, which are representative of the substances within the scope of this application.

A. 10-[γ-(N-β-hydroxyethyl-isobutylamino)propyl]-phenothiazine

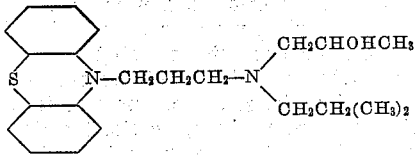

B. 3-methoxy-10-[γ-(N-β-hydroxyisopropyl-n-hexylamino)isobutyl]phenothiazine

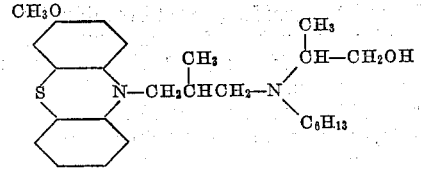

C. 3-chloro-10-[β-(N-β,γ-dihydroxypropyl-n-propylamino)-isopropyl]phenothiazine

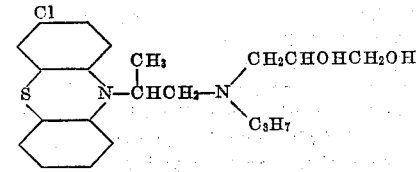

D. 10-[δ-(bis-β-hydroxyethylamino)butyl]phenothiazine dioxide

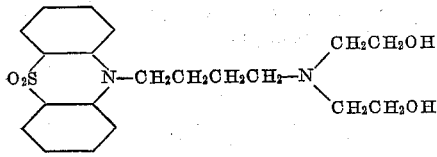

E. 10-[γ-(N-δ-hydroxybutyl-methylamino)-propyl]phenothiazine

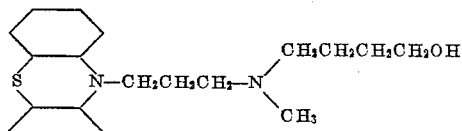

F. 3-methyl-10-[β-(N-γ-hydroxypropyl-isoamylamino)-propyl]-phenothiazine

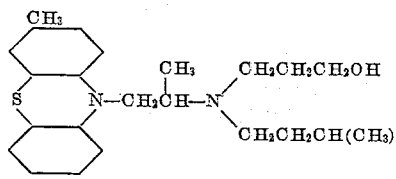

G. 10[δ-(β-hydroxypropylamino)butyl]phenothiazine

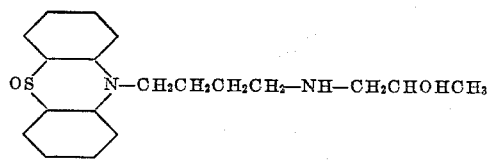

The compounds to which this invention relates are of use as therapeutic agents. They are in general antihistaminic, antiallergic and antispasmodic drugs. Certain of them have local anesthetic properties and some are of value in preventing anaphylaxis. The quaternary ammonium salts are surface active and have antiseptic qualities. The organic bases per se are of value as medicinal agents. These are high-boiling oils in general, and are soluble only in organic solvents.

In practice it is preferable to use these organic bases in the form of salts with non-toxic organic and inorganic acids, or as quaternary ammonium salts with reactive organic halides and esters. Among the acids which I have found of value for salt formation are hydrochloric, hydrobromic, hydriodic, sulfuric, phosphoric, tartaric, ascorbic, sulfamic, citric, acetic, lactic, maleic, malic, succinic, gluconic, benzoic, salicyclic and the like. Reactive esters and halides which are suitable for quaternary salt formation include the alkyl halides such as methyl chloride, methyl iodide, ethyl bromide, propyl bromide, butyl chloride and n-butyl bromide; aralkyl halides such as benzyl bromide, benzyl chloride, naphthylmethyl chloride, phenethyl bromide, anisyl and veratryl chlorides; hydroxyalkyl halides as, for example, ethylene bromohydrin, propylene chlorohydrin, glycerol monochlorohydrin and δ-bromobutanol; esters such as dimethyl sulfate, diethyl sulfate, methyl p-toluenesulfonate, propyl benzenesulfonate and the like. Salts can also be formed by the addition of acidic xanthine compounds of the type of 8-chlorotheophylline, 8-bromotheophylline and related 8-haloxanthines. The salts are free bases and are all useful substances; it is understood that in this application and appended claims reference to the bases is also meant to include acid addition and quaternary salts thereof.

The basic compounds which comprise my invention can be made by reacting a 10-(haloalkyl)-phenothiazine derivative with an atertiary amine of the general formula

wherein R and R' have the meanings given hereinabove. During the reaction the elements of halogen acid, HX, are split out. The bases are generally isolated by alkalization and extraction. In some instances the hydrohalide salt of the base may be isolated in relatively pure form from the reaction mixture.

When the bivalent group, X, which is present in all my compounds and which is set forth in the general formula given in the statement of invention, represents SO and $SO_2$, it may be termed a bivalent oxysulfur radical as it is composed solely of oxygen and sulfur. It is so designated in this application and appended claims.

My invention is further disclosed by the following examples, which are provided merely for the purposes of illustration and which in no way are to be construed as limiting my invention in spirit or in scope. Relative quantities of materials are given in parts by weight.

*Example 1*

24 parts of 10-(β-chloroethyl)phenothiazine and 15 parts of β-methylaminoethanol are dissolved in 170 parts of toluene and refluxed for 72 hours. The oily precipitate is removed by decantation and the decanted solution is extracted with dilute hydrochloric acid. The acid solution is made alkaline and extracted with ether. The dried ether extracts are evaporated, and the residue of 10-[β - (N - β - hydroxyethyl - methylamino)ethyl]phenothiazine distils at 242–245° C. at 3 mm. Its hydrochloride is prepared in dry ether and recrystallized from isopropanol, and melts at 185–186° C.

An ether solution of 10-[β-(N-β-hydroxyethylmethylamino)ethyl]phenothiazine is treated with an ether solution of a 10% excess of acetyl chloride and a trace of ethereal hydrogen chloride. The solution is stirred for several hours, and a precipitate of 10-[β-(N-β-acetoxyethyl-methylamino)ethyl]phenothiazine hydrochloride separates. This material is filtered off, washed and dried. It melts at about 80° C. The corresponding propionyl derivative, 10-[β-(N-β-propionoxyethyl-methylamino)ethyl]phenothiazine hydrochloride, can be obtained in the same manner by use of propionyl chloride in place of the acetyl chloride.

*Example 2*

The base of Example 1, when allowed to stand in methyl ethyl ketone with an excess of methyl bromide, forms β-(10-phenothiazyl)ethyl-β-hydroxyethyl-dimethyl-ammonium bromide, which melts at 154–155° C.

This salt can also be prepared by treating 54 parts of 10-(β-dimethylaminoethyl)phenothiazine with 30 parts of ethylene bromohydrin in 120 parts of methyl ethyl ketone. The mixture is refluxed for about 15 hours, then allowed to cool and crystallize. The material obtained in this manner is identical to that obtained above.

*Example 3*

522 parts of 10-(β-chloroethyl)phenothiazine, 356 parts of β-ethylaminoethanol and 2600 parts of dry toluene are refluxed for five days. After cooling, a precipitate forms which is removed by decantation. The decanted solution is extracted with dilute acid, and the resulting solution is made alkaline and extracted with ether. After evaporation of the solvent, the residue of 10-[β-(ethyl-β-hydroxyethylamino)ethyl]phenothiazine distils at 235–238° C. at 3 mm. pressure. The hydrochloride of this compound is made by treating an ethereal solution of the base with saturated alcoholic hydrogen chloride. After recrystallization from isopropanol, the salt melts at 154–155° C.

*Example 4*

A solution of the base obtained in Example 3 is dissolved in methyl ethyl ketone and treated with an excess of ethyl bromide. After standing for about a day, the quarternary salt, β-(10-phenothiazyl)ethyl-β-hydroxyethyl-diethyl-ammonium bromide, separates. This, after washing with methyl ethyl ketone and ether, melts at 147–148° C.

The same quaternary salt may be prepared by treating 298 parts of 10-(β-diethylaminoethyl)-phenothiazine in methyl ethyl ketone with 150 parts of ethylene bromohydrin. The solution is maintained at 60-65° C. in a closed vessel for four days. The quarternary salt is isolated as above, and is identical with the compound described above.

*Example 5*

20 parts of the base obtained in Example 1, 20 parts of ethylene bromohydrin and 50 parts of methyl ethyl ketone are mixed and refluxed for five hours. After standing, a precipitate of the quaternary salt, β-(10-phenothiazol)-ethyl-methyl-di-(β-hydroxyethyl)-ammonium bromide, forms. This is separated, washed with ether, and dried.

*Example 6*

286 parts of 10-(β-dimethylaminoethyl)phenothiazine monoxide, 200 parts of ethylene bromohydrin and 1250 parts of methyl ethyl ketone are mixed and refluxed for 5–6 hours. The precipitate of the quaternary salt which forms is removed by filtration and dried. It melts at 215–217° C. It has the formula

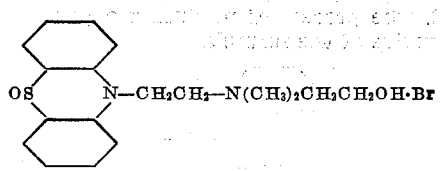

*Example 7*

A solution of 31 parts of 10-(β-chloroethyl)-phenothiazine, 25 parts of ethanolamine and 87 parts of toluene is refluxed for 48 hours. The cooled solution is extracted with dilute hydrochloric acid. The acid solution is made alkaline and extracted with ether. The ether solution is dried and evaporated. The residue of 10-[β-(β-hydroxyethylamino)ethyl]phenothiazine is a light-colored oil. It is taken up in benzene and ether, and treated with an equivalent amount of anhydous alcoholic hydrogen chloride. The solid hydrochloride is recrystallized from isopropanol and melts at 158–160° C.

*Example 8*

27 parts of 10-β-dimethylaminoethylphenothiazine and 12 parts of ethylene chlorohydrin are dissolved in 60 parts of methyl ethyl ketone and refluxed for 4–5 hours. The mixture is chilled and the precipitate of the quaternary salt is collected on a filter and dried. A sample on analysis was found to contain 10.16% chlorine; the theoretical amount is 10.11%.

I claim:
1. A member of the group consisting of a hydroxyalkylaminoalkylphenothiazine derivative having the formula

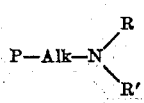

wherein P is a phenothiazyl nucleus, Alk is an alkylene radical, R is an alkyl radical substituted with at least one hydroxyl radical, and R' is a member of the group consisting of hydrogen, alkyl and hydroxyalkyl radicals, and acid addition and quaternary ammonium salts thereof.

2. A hydroxyalkylaminoalkylphenothiazine derivative having the formula

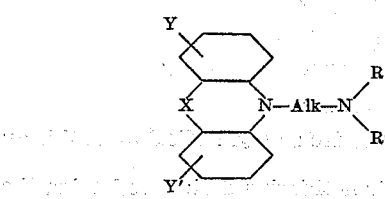

wherein X is a member of the group consisting of S, SO and SO₂, Y and Y' are members of the group consisting of hydrogen, alkyl, halo and alkoxy radicals, Alk is an alkylene radical, R is an alkyl radical substituted with at least one hydroxyl radical, and R' is a member of the group consisting of hydrogen, alkyl and hydroxyalkyl radicals.

3. A 10-[N-(hydroxyalkyl)alkylaminoalkyl]-phenothiazine.

4. A 10-[N-(hydroxyalkyl)alkylaminoalkyl]-phenothiazine oxide.

5. A new phenothiazine derivative having the formula

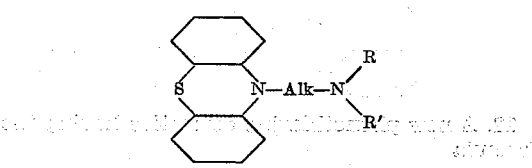

wherein Alk is an alkylene radical, R is an alkyl radical substituted with at least one hydroxyl radical, and R' is a member of the group consisting of hydrogen, alkyl and hydroxyalkyl radicals.

6. A new phenothiazine derivative having the formula

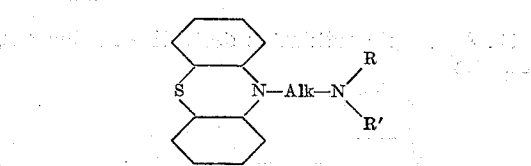

wherein Alk is an alkylene radical, R is an alkyl radical substituted with at least one hydroxyl group, and R' is an alkyl radical.

7. A new phenothiazine derivative having the formula

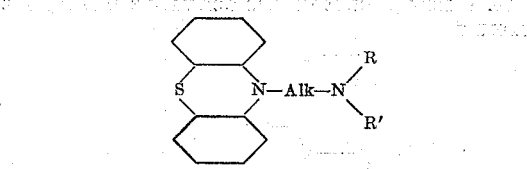

wherein Alk is an alkylene radical and R and R' are hydroxyalkyl radicals.

8. A new phenothiazine derivative having the formula

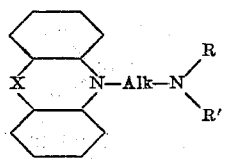

wherein X is a SO radical, Alk is an alkylene radical, R is a hydroxyalkyl radical and R' is an alkyl radical.

9. A new phenothiazine derivative having the formula

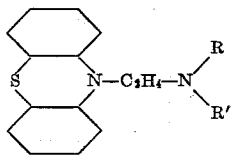

wherein R is a hydroxyalkyl radical and R' is an alkyl radical.

10. A new phenothiazine derivative having the formula

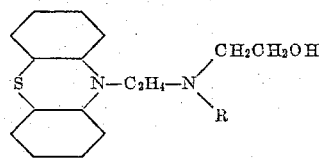

wherein R is an alkyl radical.

11. 10 - [β - (N - β - hydroxyethyl - methylamino)ethyl]-phenothiazine, which has the formula

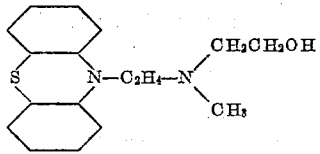

12. A new phenothiazine derivative having the formula

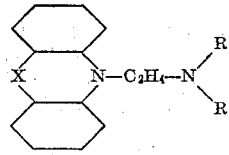

wherein X is a SO radical, R is a hydroxyalkyl radical and R' is an alkyl radical.

13. A new phenothiazine derivative having the formula

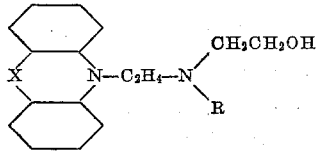

wherein X is a SO radical and R is an alkyl radical.

14. A new phenothiazine derivative having the formula

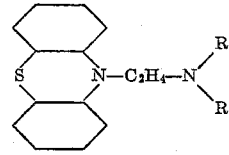

wherein R and R' are hydroxyalkyl radicals.

15. A new phenothiazine derivative having the formula

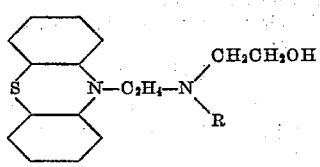

wherein R is a hydroxyalkyl radical.

16. 10 - [β - bis - (β-hydroxyethyl)aminoethyl] phenothiazine, which has the formula

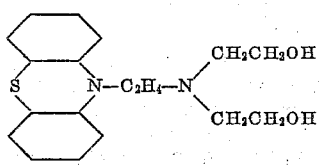

17. The process of producing a phenothiazine derivative of the formula

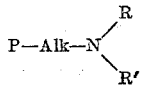

wherein P is a phenothiazyl nucleus, Alk is an alkylene radical, R is an alkyl radical substituted with at least one hydroxyl radical, and R' is a member of the group consisting of hydrogen, alkyl and hydroxyalkyl radicals, which comprises reacting in an inert solvent a compound of the formula

wherein X is a halogen, with an amine of the formula

and isolating the product so formed.

18. The process of producing a phenothiazine derivative of the formula

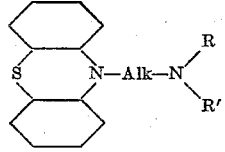

wherein Alk is an alkylene radical, R is an alkyl radical substituted with at least one hydroxyl radical, and R' is a member of the group consisting of hydrogen, alkyl and hydroxyalkyl radicals, which comprises reacting in an inert solvent a 10-phenothiazylalkyl halide with a tertiary hydroxyalkylamine of the formula H—NRR', and isolating the product so formed.

19. The process of producing a phenothiazine derivative of the formula

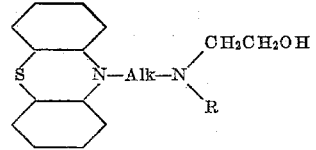

wherein Alk is an alkylene radical and R is an alkyl radical, which comprises reacting in an inert solvent a 10-phenothiazylalkyl halide with a secondary β-hydroxyethylamine of the formula

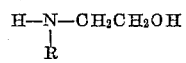

and isolating the product so formed.

20. The process of preparing a 10-[β-(N-β-hydroxyethyl - alkylamino)alkyl]phenothiazine, which comprises reacting in an inert solvent a 10-phenothiazylalkyl halide with a β-hydroxyethyl-alkylamine, and recovering the product so formed.

21. The process of preparing 10-[β-(N-β-hydroxyethyl - methylamino)ethyl]phenothiazine which comprises reacting in toluene 10-(β-chloroethyl)phenothiazine with β-methylaminoethanol, and isolating the product so formed.

JOHN W. CUSIC.

REFERENCES CITED

The following references are of record in the file of this patent:

UNITED STATES PATENTS

| Number | Name | Date |
|---|---|---|
| 2,302,388 | Hester | Nov. 17, 1942 |

OTHER REFERENCES

Gilman et al., Jour. Am. Chem. Soc. 66, 888–892 (1944)

Certificate of Correction

Patent No. 2,512,520                                              June 20, 1950

JOHN W. CUSIC

It is hereby certified that error appears in the printed specification of the above numbered patent requiring correction as follows:

Column 1, line 2, for "allyl" read *alkyl*; column 3, line 19, for "G. 10[" read *G. 10-[*; line 45, for "lacetic" read *lactic;* column 5, line 9, for "quarternary" read *quaternary*; line 28, for "phenothiazol" read *phenothiazyl*;

and that the said Letters Patent should be read as corrected above, so that the same may conform to the record of the case in the Patent Office.

Signed and sealed this 10th day of October, A. D. 1950.

[SEAL]

THOMAS F. MURPHY,
*Assistant Commissioner of Patents.*